UNITED STATES PATENT OFFICE.

JACOB OSBORN, OF AVON, OHIO.

IMPROVEMENT IN THE MODE OF EXTRACTING THE ALKALI FROM ASHES IN THE MANUFACTURE OF POTASH.

Specification forming part of Letters Patent No. 1,697, dated July 18, 1840.

*To all whom it may concern:*

Be it known that I, JACOB OSBORN, late of Elyria, but now of Avon, in the county of Lorain and State of Ohio, have invented a new and improved mode of extracting the alkaline properties of the ashes of wood for the purpose of working them into pot and pearl ashes by the use of a solution prepared for the purpose of making the extraction and purifying the article produced; and I do hereby declare that the following is a full and exact description.

The nature of my invention consists in the use of alum added to lime and salt (heretofore used as a solution for extracting of the alkaline properties from the ashes of wood) in such proportions as to extract the whole of said alkalies and leave the lyes in such a state that the after process of working shall wholly purify the article produced (whether pot or pearls) from the article or properties of salt, which, left in the article, is detrimental.

To enable others skilled in the manufacture of the same to prepare and use my invention, I will proceed to describe the mixture or solution and operation in the work—that is to say, to make a solution.

To extract the alkaline properties from fourteen bushels of ashes, put into one hundred gallons of water in a boiler one-fourth of a pound of alum, one pint of salt, and one peck of stone-lime, and in that proportion for a greater or less quantity of ashes. Heat the solution boiling hot, and it is prepared for use. Prepare the leach for the reception of the ashes with sticks upon the bottom. Cover them with a thin layer of straw. Then put in one-fourth of the ashes and put onto them one-fourth of the solution, and in this manner one-fourth at a time until the leach is filled. Then put on boiling water until the lye commences running, and then cold or hot water may be used as will suit the convenience of the manufacturer. The after process of working into salts and from that to pot and pearls is carried on in the usual manner; but in the use of the oven for scorching or pearling the manufacturer is cautioned not to raise the heat so high as to melt the article.

What I claim as my invention, and desire to secure by Letters Patent, is—

The addition and application of alum with lime and salt in such proportions as will extract the whole of the alkaline properties of the ashes and operate as a cleanser of the article produced, and not for inventing any new mode of working them into pot or pearl ashes.

JACOB OSBORN. [L. S.]

Witnesses:
HEMAN BIRCH,
ELIJAH PARKER.